July 8, 1952     W. M. WHEILDON, JR     2,602,708

BEARING COMBINATION

Filed March 24, 1950

Inventor
WILLIAM MAXWELL WHEILDON, JR

By George C. Compton Jr.
Attorney

Patented July 8, 1952

2,602,708

UNITED STATES PATENT OFFICE 2,602,708

BEARING COMBINATION

William Maxwell Wheildon, Jr., Framingham, Mass., assignor to Norton Company, Worcester, Mass., a corporation of Massachusetts Application March 24, 1950, Serial No. 151,582

6 Claims. (Cl. 308—3)

The invention relates to a journal bearing combination, that is to say a journal and a bearing therefor and also a bearing combination where there is no journal.

One object of the invention is to provide a journal bearing combination the parts of which will maintain their dimensions during the long periods of operation. Another object of the invention is to provide a journal bearing combination to meet unusual service conditions. Another object of the invention is to provide a journal bearing combination which will run dry without failure. Another object of the invention is to provide a journal bearing combination which will operate properly and without unreasonable wear with such unusual lubricants as water and steam. Another object of the invention is to provide a journal bearing combination operable at high speeds and under high pressures. Another object of the invention is to provide a journal bearing combination which will not deteriorate at high temperatures. Another object is to provide a journal bearing combination of extremely long life in which the two elements thereof show little wear after long periods of operation with the usual lubricants such as various oils. Another object is to provide a journal bearing combination which will not freeze even under heavy loads and at high speeds. Another object is to provide a journal bearing combination which will not conduct electricity. Another object is to provide a bearing combination (involving no journal, such as in the case of flat bearings) having one or more of the above features and advantages. Another object is to provide a bearing combination, whether journal bearing combination or involving flat bearings or any other species, the elements of which are unusually resistant to acids and other corrosives including in this connection water, which rusts iron and many steels, whereby the bearing combination will not be affected by any liquids.

Other objects will be in part obvious or in part pointed out hereinafter.

Figure 1:
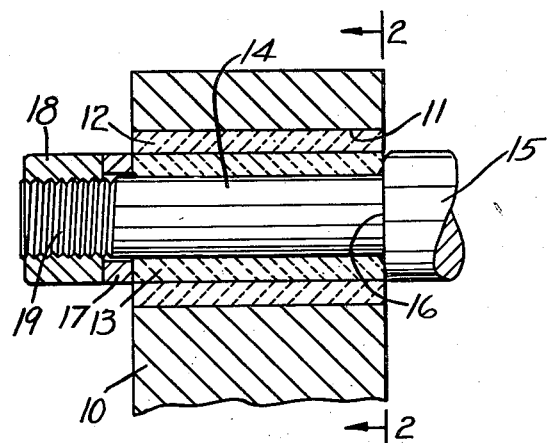
Figure 2:
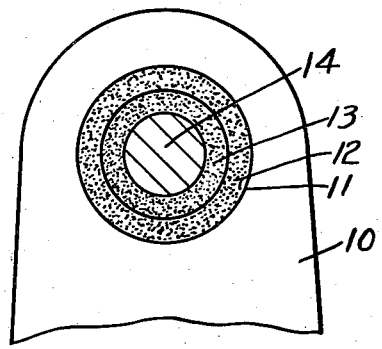
Figure 3:
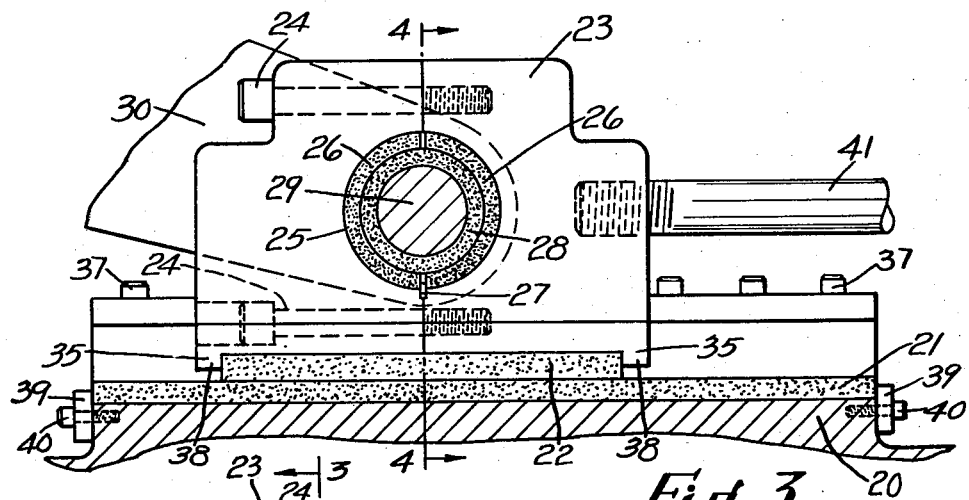
Figure 4:
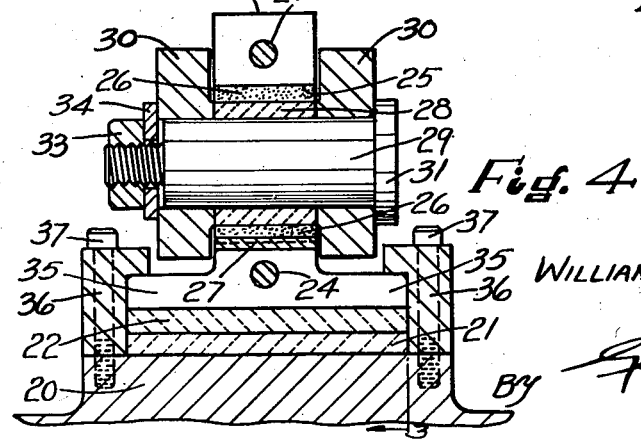

In the accompanying drawings illustrating some of the many possible embodiments of the invention:

Figure 1 is an axial sectional view of a shaft having a journal piece thereon rotatably supported by a bearing, Figure 2 is a vertical sectional view taken on the line 2—2 of Figure 1, Figure 3 is an elevation of a piston rod guide and slideway therefor (the latter in section) showing a sliding thrust plate attached to the piston rod guide and a slideway supporting plate held by the slideway, Figure 4 is a vertical sectional view taken on the line 4—4 of Figure 3.

The journal bearing combination of the present invention is zirconium oxide and boron carbide. By zirconium oxide I mean a massive piece of crystalline zirconium oxide (desirably containing 3% to 6% of a stabilizing agent such as lime CaO) made by uniting, under heat and pressure, granules of previously fused zirconia. That is to say, a quantity of the material is melted in an electric furnace, then it is allowed to solidify and finally it is crushed or otherwise disintegrated to form granules of any desired grit size. Sometimes the starting material is zircon and sometimes it is zirkite or baddeleyite, together with enough carbon to reduce the other oxides present and together with enough iron to unite with the silicon reduced from silica to form a ferrosilicon which goes to the bottom of the pig or ingot, and preferably together with 3% to 6% lime on the amount of $ZrO_2$ in the ore. At other times the fusion is a fusion of relatively pure zirconium oxide, with or without the added lime, this zirconium oxide having been made by chemical processes and lacking the desired physical characteristics until it is fused and allowed to crystallize from molten phase.

It is now possible to take a quantity of granular zirconium oxide having a purity of 98% total $ZrO_2$ plus CaO which may or may not have 3% to 6% of lime on the total $ZrO_2$, place this in a suitable mold and mold the granular material to a solid body by the application of pressure coincident with heating. The pressure should be at least 1000 pounds per square inch and can be greater, there being no upper limit except that imposed by the strength of the mold which is usually made of graphite. Two thousand five hundred pounds to the square inch has been found to be a very practical pressure. The temperature of molding is preferably between 1700° C. and 1800° C. for the best results. The grit size of the zirconium oxide should preferably be small, preferably below 325 mesh. This molded material is very dense having less than 10% pores (as calculated by specific gravity methods). Preferably part of my journal bearing combination is made out of such zirconium oxide or zirconia. However the making of bearings by casting the molten zirconia is not precluded.

The other part of the journal bearing combination according to this invention is boron carbide. This also should be a massive piece and can likewise be made by molding with heat and pressure. I can use boron carbide of the formula $B_4C$ including materials having excess boron and also materials having excess carbon. The boron carbide useful for bearings according to this invention should be 98% total boron and carbon and can range from the empirical formula $B_{3.85}C$ to the empirical formula $B_{5.20}C$. The manufacture and molding of boron carbide is now well known and has been described in several patents so I do not need to describe the same herein.

In case the journal bearing combination is for supporting a rotating shaft and in some cases where a reciprocating shaft is cylindrical and reciprocates in a bearing, the outer piece is preferably zirconium oxide and the inner is preferably boron carbide. However in cases where the combination is for the support of a reciprocating part which is free to move in one direction normal to the reciprocation it makes no difference which is the outer part and which is the inner part. The coefficient of expansion of massive zirconium oxide is about $8.0 \times 10^{-6}$ per degree centigrade. The coefficient of expansion of massive boron carbide is $4.5 \times 10^{-6}$ per degree centigrade. Thus in the case of a journal within a bearing, by having the zirconium oxide piece on the outside, any heating of the parts causes the outside part to expand more than the inside part thus preventing freezing. However in certain instances where excessive heat will not be generated the arrangement can be reversed.

Referring now to Figures 1 and 2, a bearing support 10 has a cylindrical bore 11 in which is press fitted a sleeve 12 of massive zirconium oxide. This sleeve 12 is the bearing and in it runs a sleeve 13 of molded boron carbide which is the journal. This sleeve 13 is fitted on the reduced portion 14 of a rotatable shaft 15. At the end of the reduced portion 14 is a shoulder 16 against which the sleeve 13 is held by means of a washer 17 and a nut 18 on a threaded end 19 of the shaft 15.

Referring now to Figures 3 and 4, the base of a steam engine or pump has an integral land 20 supporting a slideway supporting plate 21 of massive zirconium oxide upon which rests a slide thrust plate 22 of molded boron carbide which supports a two part block 23 held together by bolts 24. The block 23 has a cylindrical bore 25 holding two semi-cylindrical sleeve portions 26 of massive zirconium oxide which are held from rotating relative to the block 23 by a gib 27. These two semi-cylindrical sleeve portions of massive zirconium oxide constitute a bearing which supports a journal 28 on a pin 29 passing through the forked end 30 of a connecting rod. The pin 29 has a head 31 at one end and a screw threaded portion at the other end on which is a nut 33 thrusting against a washer 34 which abuts the forked end 30. Thus the journal 28 is tightly secured to the forked end 30 of the connecting rod and the journal 28 is oscillatable within the bearing 26 and in this instance the journal 28 is made of molded boron carbide.

The two part block 23 as best shown in Figure 4 has a wide portion 35 just above the slide thrust plate 22 which is guided by L-shaped slideway guides 36 held onto the land 20 by means of bolts 37. However there is a good sliding clearance between the L-shaped slideway guides 36 and the enlarged portion 35 of the two part block 23. Lug portions 38 overlap the ends of the plate 22 and hold it in position. Similarly lugs 39 secured by bolts 40 to the land 20 hold the slideway supporting plate 21 in position.

If the apparatus of Figures 3 and 4 is a slideway and piston rod guide for the piston rod 41 of a pump, for example an air pump, the crank not shown connected to the connecting rod of which the forked end 30 is shown will rotate clockwise and the resultant thrust on the block 23 will be downward. If, on the other hand, the apparatus is a slideway and piston rod guide for the piston rod 41 of a steam engine, the crank will be rotated counterclockwise and the thrust will still be downward. Thus the bearing combination of Figures 3 and 4 is a sliding thrust plate bearing combination. In such a combination it makes no difference which part is zirconium oxide and which part is boron carbide. The slide thrust plate bearing combination of this invention can be used in many other situations; that illustrated being merely one common use for a sliding thrust plate bearing combination Figures 3 and 4 also illustrate a journal bearing combination for the articulation of parts one of which oscillates relative to the other and they also illustrate the case of a split bearing. The journal bearing combination of the invention can be used with superior results for the rotatable or oscillatable support of machine parts where the thrust is radial and also where the thrust is axial. Accordingly the three embodiments herein depicted and described are to be taken as purely illustrative since the combination of the invention can be embodied in any known mechanical arrangement of relatively moving parts.

For the fabrication of the journals, the bearings and the plates, both stationary and moving, molding, as already fully understood in the ceramic and refractory arts, is preferably utilized. For finishing the surfaces that are to be in contact with relatively moving surfaces grinding wheels, particularly diamond grinding wheels, are preferably used. Grinding may be followed with lapping and in this manner beautiful mirror-like surfaces can be produced on the hard materials herein specified. Naturally in the case of journal bearing combinations the fit should be the best that can be achieved allowing just enough clearance for free rotation and for a film of oil or water. The journal bearing combination and also the sliding thrust plate bearing combination of the invention are preferably lubricated with oil, but so perfect are the surfaces when ground and lapped, so hard are the materials and so immune are they in the combination specified to the effects of seizure that they can run dry under considerable loads and at high speeds for a long time without deterioration. This capability is a great advantage in many situations. For the manufacture of a split bearing such as the semi-cylindrical sleeve portions 26 a full bearing is first made, then ground, then lapped, and finally it is split into two pieces with a diamond cutoff wheel.

Tests were made of the resistance to wear of the combination of this invention and of other combinations. In each test a disc four inches in diameter and one-eighth of an inch thick was rotated with its periphery against a flat block with a speed of rotation of 650 R. P. M. and a load of six pounds, for a total time of two hours and with no lubricant, the test conditions being the same in every case, with the following results as to total wear on both the disc and the block.

Table I

| Disc | Block | Total Wear Cubic Millimeters |
|---|---|---|
| Boron Carbide | Zirconium Oxide | 0.90 |
| Boron Carbide | Boron Carbide | 7.00 |
| Hard Steel | Hard Steel | 17.00 |
| Hard Steel | Tungsten Carbide | 22.00 |
| Aluminum Oxide | Zirconium Oxide | 36.00 |
| Hard Steel | Bronze | 43.00 |

One advantage of the combination of the invention is that both elements are refractory as well as hard. By elements in this connection I mean the journal and bearing or the two bearing parts. Furthermore the elements will not deteriorate nor lose their wear resistant properties even if heated to a temperature of 1000° F. Another advantage of the combination of this invention is that, as a combination, it is an electrical insulator which is a desired feature for many modern machines.

Generically a journal is a bearing, so therefore generically this invention concerns a bearing combination, one element being boron carbide (as defined) and the other element being zirconium oxide (as defined). The journal bearing combination is a specific case. Slideway supporting plates and slide thrust plates are other specific cases since each is a bearing element. Each of the elements of the bearing combination is highly resistant to acids and other corrosives.

It will thus be seen that there has been provided by this invention a bearing combination in which the various objects hereinabove set forth together with many thoroughly practical advantages are successfully achieved. As many possible embodiments may be made of the above invention and as many changes might be made in the embodiments above set forth, it is to be understood that all matter hereinbefore set forth or shown in the accompanying drawings is to be interpreted as illustrative and not in a limiting sense. For the zirconium oxide element in this invention I prefer the stabilized variety. There are various formulae for stabilized zirconium oxide, for example magnesia will stabilize zirconia. A stabilized zirconia is a zirconia which does not undergo a sharp volume change at a particular temperature. My experience, however, has been with lime stabilized zirconia having 3% to 6% CaO on the $ZrO_2$ and the pieces which were tested as reported in Table I were of this variety of zirconium oxide or zirconia.

I claim:
1. A bearing combination consisting of two elements, one of said elements being a massive piece of crystalline zirconium oxide having a purity of at least 92% total $ZrO_2$ and not more than 2% of said element being other material other than CaO and magnesia and not more than 6% of said element being material selected from the group consisting of CaO and magnesia, said element having a ground bearing surface, and the other of said elements being a molded piece of boron carbide whose composition is 98% total boron and carbon and ranges between the empirical formulae $B_{3.85}C$ and $B_{5.20}C$, said boron carbide element having a ground bearing surface.

2. A bearing combination consisting of two elements, one of said elements being a massive piece of crystalline stabilized zirconium oxide containing 3% to 6% of CaO on the $ZrO_2$ and having a purity of 98% total $ZrO_2$ and CaO, said element having a ground bearing surface, and the other of said elements being a molded piece of boron carbide whose composition is 98% total boron and carbon and ranges between the empirical formulae $B_{3.85}C$ and $B_{5.20}C$, said boron carbide element having a ground bearing surface.

3. A bearing combination according to claim 1 in which one element is a journal and is the inner element and is the boron carbide element.

4. A bearing combination according to claim 2 in which one element is a journal and is the inner element and is the boron carbide element.

5. A bearing combination according to claim 1 in which one element is a slideway and the other element is a slide plate.

6. A bearing combination according to claim 2 in which one element is a slideway and the other element is a slide plate.

WILLIAM MAXWELL WHEILDON, Jr.

REFERENCES CITED

The following references are of record in the file of this patent:

UNITED STATES PATENTS

| Number | Name | Date |
|---|---|---|
| 2,027,788 | Ridgway et al. | Jan. 4, 1936 |
| 2,535,526 | Ballard et al. | Dec. 26, 1950 |